United States Patent
Furuta et al.

(10) Patent No.: US 9,972,342 B2
(45) Date of Patent: May 15, 2018

(54) TERMINAL DEVICE AND COMMUNICATION METHOD FOR COMMUNICATION OF SPEECH SIGNALS

(71) Applicant: JVC KENWOOD Corporation, Yokohama-shi, Kanagawa (JP)

(72) Inventors: Hiroshi Furuta, Yokohama (JP); Eiiti Hosono, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days. days.

(21) Appl. No.: 15/352,641

(22) Filed: Nov. 16, 2016

(65) Prior Publication Data

US 2017/0148469 A1   May 25, 2017

(30) Foreign Application Priority Data

Nov. 20, 2015   (JP) ................................. 2015-227480
Nov. 20, 2015   (JP) ................................. 2015-227481

(51) Int. Cl.
*G10L 25/72*   (2013.01)
*G10L 15/187*  (2013.01)
*G10L 15/30*   (2013.01)
*G10L 25/51*   (2013.01)

(52) U.S. Cl.
CPC ............ *G10L 25/72* (2013.01); *G10L 15/187* (2013.01); *G10L 15/30* (2013.01); *G10L 25/51* (2013.01)

(58) Field of Classification Search
CPC ....... G10L 25/72; G10L 15/187; G10L 15/30; G10L 25/51

USPC ......................................................... 704/201
See application file for complete search history.

(56) References Cited

U.S. PATENT DOCUMENTS

| | | | |
|---|---|---|---|
| 9,679,563 B2* | 6/2017 | Lee ......................... | G10L 15/22 |
| 9,720,644 B2* | 8/2017 | Ohmura ................. | G06F 3/167 |
| 2002/0059068 A1* | 5/2002 | Rose ....................... | G10L 15/08 |
| | | | 704/246 |
| 2004/0176953 A1* | 9/2004 | Coyle ..................... | G10L 15/22 |
| | | | 704/253 |
| 2005/0043948 A1* | 2/2005 | Kashihara ............. | G10L 15/142 |
| | | | 704/242 |
| 2011/0022389 A1* | 1/2011 | Kim ....................... | G10L 15/07 |
| | | | 704/246 |
| 2012/0310645 A1* | 12/2012 | Gruenstein ............. | G10L 15/32 |
| | | | 704/235 |
| 2014/0142945 A1* | 5/2014 | Fry ......................... | G10L 15/26 |
| | | | 704/254 |
| 2014/0303975 A1* | 10/2014 | Ohmura ................. | G06F 3/167 |
| | | | 704/235 |
| 2014/0379334 A1* | 12/2014 | Fry ......................... | G10L 15/22 |
| | | | 704/235 |

(Continued)

FOREIGN PATENT DOCUMENTS

JP    2000-112497 A    4/2000

*Primary Examiner* — Seong Ah A Shin
(74) *Attorney, Agent, or Firm* — Brundidge & Stanger, P.C.

(57) ABSTRACT

A reception unit receives a speech signal from another terminal device. A reproduction unit reproduces the speech signal received in the reception unit. A processing unit performs a speech recognition process on the speech signal reproduced in the reception unit, based on a speech recognition model of a user using the terminal device. A transmission unit transmits a result of the speech recognition process in the processing unit to another terminal device.

2 Claims, 14 Drawing Sheets

(56) References Cited

U.S. PATENT DOCUMENTS

| | | | |
|---|---|---|---|
| 2015/0206530 A1* | 7/2015 | Choi | G10L 15/22 704/249 |
| 2015/0379992 A1* | 12/2015 | Lee | G10L 15/22 704/275 |
| 2017/0076716 A1* | 3/2017 | Lee | G10L 15/063 |

* cited by examiner

26

26

26

26

26

26

26

26

26

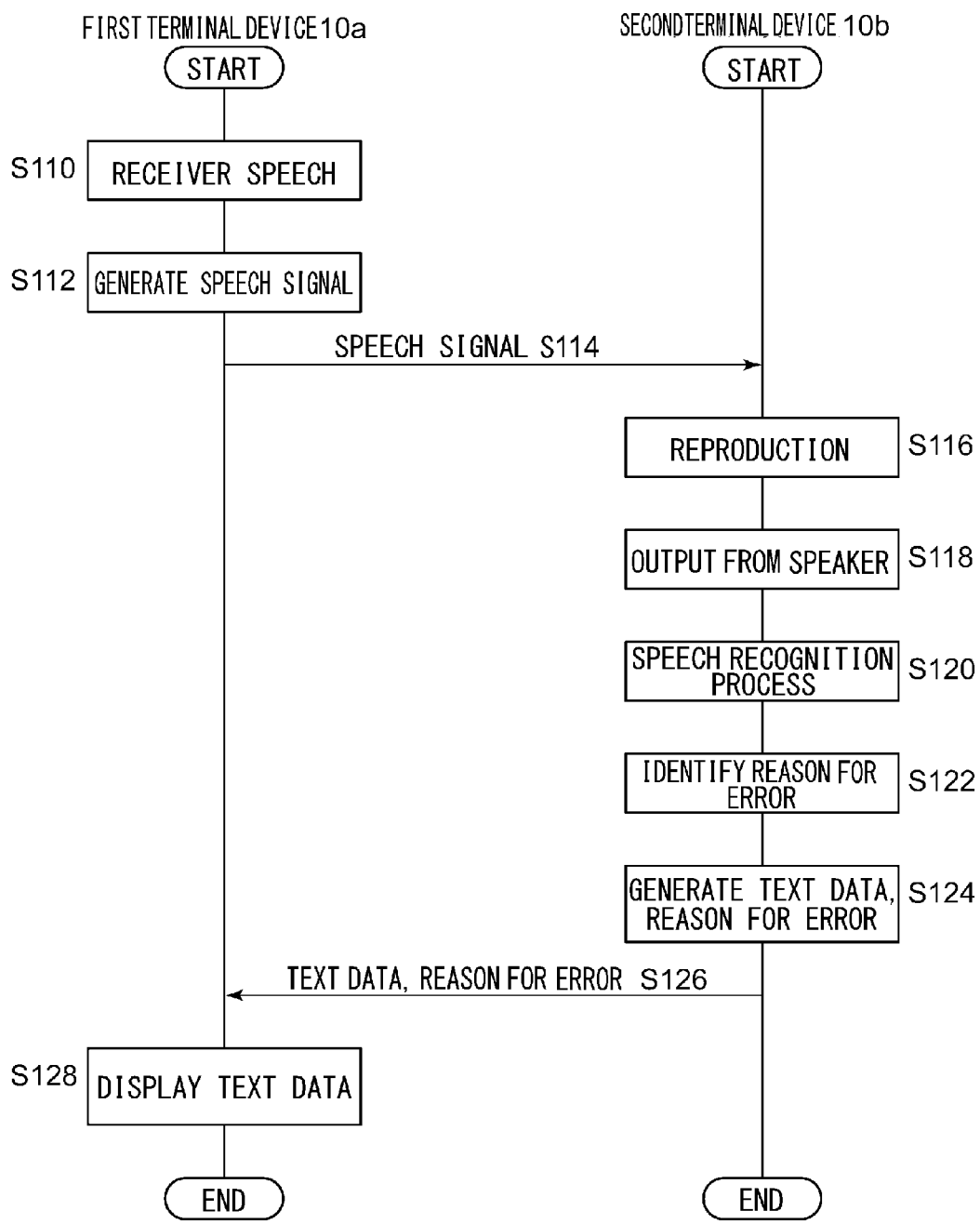

TERMINAL DEVICE AND COMMUNICATION METHOD FOR COMMUNICATION OF SPEECH SIGNALS

CROSS-REFERENCE TO RELATED APPLICATION

This application is based upon and claims the benefit of priority from the prior Japanese Patent Application No. 2015-227480, filed on Nov. 20, 2015 and Japanese Patent Application No. 2015-227481, filed on Nov. 20, 2015, the entire contents of which are incorporated herein by reference.

BACKGROUND

1. Field

The present invention relates to communication technologies and, more particularly, to terminal devices and communication methods adapted to communicate speech signals.

2. Description of the Related Art

In a speech recognition process, failure in recognition occurs in the presence of ambient noise or if the sound is too small. Repetition of speech recognition processes may also result in failure in recognition. In particular, if an operator does not know a reason for failure in recognition, failure in recognition is likely to be repeated. In order to prevent this, a reason for failure in recognition is communicated to an operator (e.g., patent document 1).

[patent document 1] Japanese Patent Application Laid-open No. 2000-112497

Generally, a speech recognition is performed on a speech signal carrying speech data. Meanwhile, the sound heard by a receiver of speech is configured by parameters such as on/off of an equalizer, sound volume level output from a speaker, and on/off of speech speed transformation. For this reason, the sound heard by the receiver of speech may differ from the speech signal. Even if the sound reproduced from the same speech signal is heard, the way that the sound is heard may differ depending on the receiver of speech. It is therefore desired that a speech recognition process be performed depending on the situation of the receiver of speech.

SUMMARY

The terminal device according to one embodiment comprises: a reception unit that receives a speech signal from another terminal device; a processing unit that performs a speech recognition process based on the speech signal received in the reception unit, reflecting a speech recognition way by a user using the terminal device; and a transmission unit that transmits a result of the speech recognition process in the processing unit to another terminal device.

Another embodiment also related to a terminal device. The terminal device comprising: a reception unit that receives a speech signal from another terminal device; a configuration unit in which a configuration parameter that should be used to reproduce the speech signal received in the reception unit is defined; a reproduction unit that reproduces the speech signal received in the reception unit in accordance with the configuration parameter defined in the configuration unit; a processing unit that performs a speech recognition process on the speech signal reproduced in the reproduction unit; and a transmission unit that transmits a result of the speech recognition process in the processing unit to another terminal device.

Still another embodiment also relates to a terminal device. The terminal device comprises: a reception unit that receives a speech signal from another terminal device; a configuration unit in which a configuration parameter that should be used to reproduce the speech signal received in the reception unit is defined; a reproduction unit that reproduces the speech signal received in the reception unit in accordance with the configuration parameter defined in the configuration unit; a microphone that picks up sound around the terminal device; a processing unit that performs a speech recognition process on the speech signal reproduced in the reproduction unit, reflecting information on sound picked up in the microphone; and a transmission unit that transmits a result of the speech recognition process in the processing unit to another terminal device.

Still another embodiment also relates to a terminal device. The terminal device comprises: a reception unit that receives a speech signal from another terminal device; a reproduction unit that reproduces the speech signal received in the reception unit; a microphone that picks up sound around the terminal device; a processing unit that performs a speech recognition process on the speech signal reproduced in the reproduction unit, reflecting information on sound picked up in the microphone; and a transmission unit that transmits a result of the speech recognition process in the processing unit to another terminal device.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 11 is a sequence diagram showing steps of communication in the communication system according to Embodiment 4;

DETAILED DESCRIPTION

The invention will now be described by reference to the preferred embodiments. This does not intend to limit the scope of the present invention, but to exemplify the invention.

Embodiment 1

A brief summary will be given before describing the invention in specific details. Embodiment 1 relates to a terminal device adapted to communicate speech using a Push to Talk (PTT) service. The terminal device is provided with a button. Transmission of speech is started as the user pressed down the button and terminated by releasing the button. Meanwhile, the user only hears a message when he or she is not pressing the button. In PTT services like this, an act of a transmitter of speech speaking and transmitting is complete in itself. The transmitter of speech must depend on a reaction of a receiver of speech to know how the speech is conveyed. The transmitter of speech may think that the content of speech is properly conveyed. In reality, however, the speech may not be conveyed as intended to the receiver of speech due to bad communication conditions, large noise, too fast speech, etc.

The terminal device at the receiving end addresses this by running a speech recognition process whereby the received speech signal is turned into texts, and data turned into texts (hereinafter, referred to as "text data") are transmitted to the terminal device at the transmitting end. The terminal device at the transmitting end displays the text data. The transmitter of speech sees whether the speech as intended is output by seeing the text data. However, the way that a speech is heard varies depending on individual receivers of speech. The same speech may be heard differently. For this reason, the content of text data and the content actually recognized by the receiver of speech may differ.

In order to address this issue, the terminal device according to this embodiment, and, in particular, the terminal device at the receiving end uses a speech recognition model of the user using the terminal device, i.e., the receiver of a speech, to run the speech recognition process. Therefore, the content of text data generated in the terminal device reflects the speech recognition way by the receiver of speech.

Figure 1:
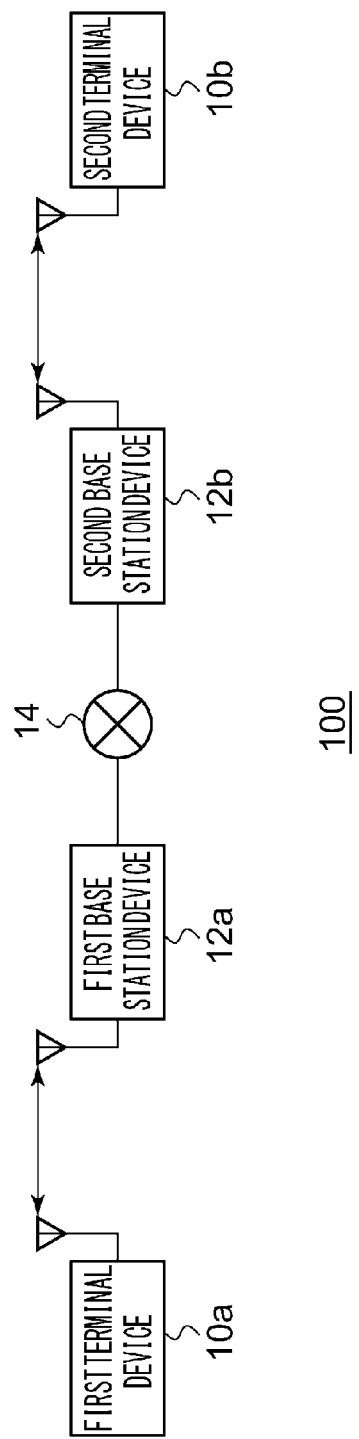
FIG. 1 shows a configuration of a communication system according to Embodiment 1.

FIG. 1 shows a configuration of a communication system 100 according to Embodiment 1. The communication system 100 includes: a first terminal device 10a and a second terminal device 10b, which are generically referred to as terminal devices 10; a first base station device 12a and a second base station device 12b, which are generically referred to as base station devices 12; and a network 14. For example, the communication system 100 corresponds to a business wireless system.

The terminal device 10 is enabled for communicating using a business wireless system. A publicly known technology may be used for the business wireless system and a description thereof is omitted. The first terminal device 10a corresponds to the transmitting end of speech communication in the business wireless system and the second terminal device 10b corresponds to the receiving end of speech communication in the business wireless system. Therefore, the first terminal device 10a is used by a transmitter of speech and the second terminal device 10b is used by a receiver of speech. The first terminal device 10a and the second terminal device 10b may change their roles, and the number of terminal devices 10 is not limited to "2."

The base station device 12 corresponds to a business wireless system and connected at one end thereof to the terminal device 10 using the business wireless system and connected at the other end to the network 14. The first base station device 12a and the second base station device 12b are provided at different locations. In business wireless communication, a plurality of terminal devices 10 may form a group. The base station device 12 may assign an upstream channel and a downstream channel to a group. In this situation, one of the terminal devices 10 in a group transmits a signal using the upstream channel, and another terminal device 10 in the group receives the signal using the downstream channel.

The network 14 connects the first base station device 12a and the second base station device 12b. The first terminal device 10a and the second terminal device 10b are capable of communicating with each other via the first base station device 12a, the network 14, and the second base station device 12b. It is assumed here that the terminals communicate using a PTT service.

Figure 2:
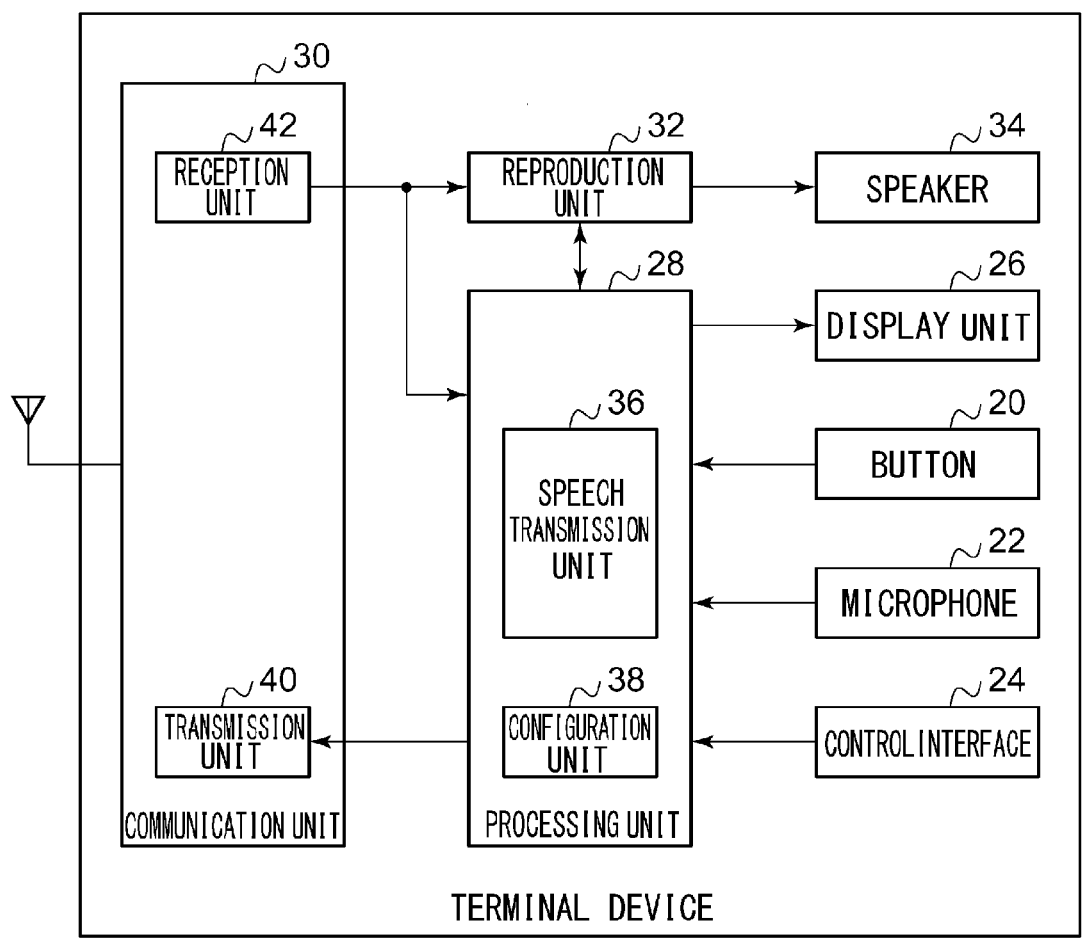
FIG. 2 shows a configuration of the terminal device of FIG. 1.

FIG. 2 shows a configuration of the terminal device 10. The terminal device 10 includes a button 20, a microphone 22, a control interface 24, a display unit 26, a processing unit 28, a communication unit 30, a reproduction unit 32, and a speaker 34. The processing unit 28 includes a speech transmission unit 36 and a configuration unit 38. The communication unit 30 includes a transmission unit 40 and a reception unit 42. The terminal device 10 may correspond to the terminal device 10 at the transmitting end or the terminal device 10 at the receiving end. For clarity of description, the description below will be given in the order of (1) transmitting end, (2) receiving end, and (3) transmitting end according to the sequence of process.

(1) Transmitting End

A description will be given of a process in the terminal device 10 at the transmitting end. The button 20 corresponds to a PTT button and is pressed by the user to transmit a speech using a PTT service. The button 20 remains pressed while the speech is being transmitted. Pressing of the button 20 corresponds to receiving an instruction for transmitting a speech signal. The button 20 continues to output the instruction to the speech transmission unit 36 while the button 20 is being pressed. The microphone 22 picks up sound around the terminal device 10. The microphone 22 converts the sound picked up into an electric signal (hereinafter, referred to as "speech signal") and outputs the speech signal to the speech transmission unit 36.

The speech transmission unit 36 receives the speech signal from the microphone 22 while the speech transmission unit 36 is receiving the instruction from the button 20. The speech transmission unit 36 converts an analog speech signal into a digital signal and outputs the digitized speech signal (hereinafter, also referred to as "speech signal") to the transmission unit 40. Meanwhile, the speech transmission unit 36 does not perform the above process when the speech transmission unit 36 does not receives an instruction from the button 20. The transmission unit 40 receives the speech signal from the speech transmission unit 36 and transmits the speech signal to the terminal device 10 at the receiving end. For transmission of the speech signal, the transmission unit 40 performs coding, modulation, frequency transformation, amplification etc.

(2) Receiving End

A description will be given of a process performed in the terminal device at the receiving end following (1). The reception unit 42 receives the speech signal from the terminal device 10 at the transmitting end. The reception unit 42 performs amplification, frequency transformation, demodulation, decoding, etc. The reception unit 42 outputs a processed result (hereinafter, also referred to as "speech signal") to the reproduction unit 32. The reproduction unit 32 receives the speech signal from the reception unit 42 and reproduces the speech signal. A publicly known technology may be used to reproduce the speech signal and a description thereof is omitted. The reproduction unit 32 outputs the reproduced speech signal and to the speaker 34 and the processing unit 28. The speaker 34 converts the electric speech signal into sound and outputs the sound.

The processing unit 28 receives the speech signal from the reproduction unit 32. Meanwhile, the speech recognition model of the user using the terminal device 10, i.e., a designated receiver of speech, is configured in the configuration unit 38. For example, the waveform of a speech signal corresponding to a phoneme "Ah" is stored in the speech recognition model. Waveforms of speech signals like this are stored for respective phonemes. It should particularly be noted that the phoneme and waveform as stored are mapped to each other such that the designated receiver of speech hearing the speech can recognize. Therefore, the relationship can be said to be a speech recognition model of the receiver of speech.

The processing unit 28 subjects the speech signal to a speech recognition process, using the speech recognition model of the receiver of speech configured in the configuration unit 38. To describe it more specifically, the processing unit 28 selects a waveform closest to the waveform of the input speech signal from the speech recognition model and identifies a sound corresponding to the selected waveform. The speech recognition process turns the speech signal into a text. Thus, the processing unit 28 subjects the speech signal to a speech recognition process based on the speech recognition model of the user using the terminal device 10, i.e., performs a speech recognition process that reflects the speech recognition way by the user.

The receiver of speech uses the control interface 24 to configure the speech recognition model of the receiver of speech in the configuration unit 38. For example, the configuration unit 38 stores a waveform of a test speech signal and outputs the speech signal from the speaker 34 by reproducing the speech signal in the reproduction unit 32. The receiver of speech hears the sound from the speaker 34 and enters recognized sound, using the control interface 24. The configuration unit 38 configures the speech recognition mode of the receiver of speech based on the correspondence between the waveform of the test speech signal and the entered sound.

The transmission unit 40 receives, from the processing unit 28, text data resulting from the speech recognition process in the processing unit 28. The transmission unit 40 transmits the text data to the terminal device 10 at the transmitting end. Transmission of the text data in the transmission unit 40 may be performed in isolation or performed in concurrence with transmission of a speech signal.

(3) Transmitting End

Figure 3A:
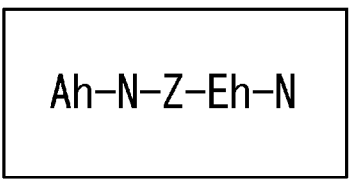
FIGS. 3A-3B show screens displayed in the display unit of FIG. 2.
Figure 3B:
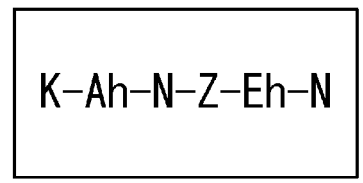

A description will be given of a process performed in the terminal device 10 at the transmitting end following (2). The reception unit 42 receives the text data from the terminal device 10 at the receiving end. The reception unit 42 outputs the text data to the processing unit 28. The processing unit 28 receives the text data from the reception unit 42 and displays the text data in the display unit 26. The transmitter of speech sees the text data displayed in the display unit 26 and recognizes how the receiver of speech hears the speech. FIGS. 3A-3B show screens displayed in the display unit 26. FIG. 3A shows a case where the transmitter of speech speaks "Ah-N-Z-Eh-N" and the receiver of speech also hears "Ah-N-Z-Eh-N." In this case, the content pronounced by the transmitter of speech matches the content heard by the receiver of speech. On the other hand, FIG. 3B shows a case where the transmitter of speech speaks "Ah-N-Z-Eh-N" and the receiver of speech hears "K-Ah-N-Z-Eh-N." In this case, the content spoken by the transmitter of speech does not match the content heard by the receiver of speech.

The features are implemented in hardware such as a CPU, a memory, or other LSI's, of a computer and in software such as a program loaded into a memory. The figure depicts functional blocks implemented by the cooperation of these elements. Therefore, it will be obvious to those skilled in the art that the functional blocks may be implemented in a variety of manners by hardware only or by a combination of hardware and software.

Figure 4:
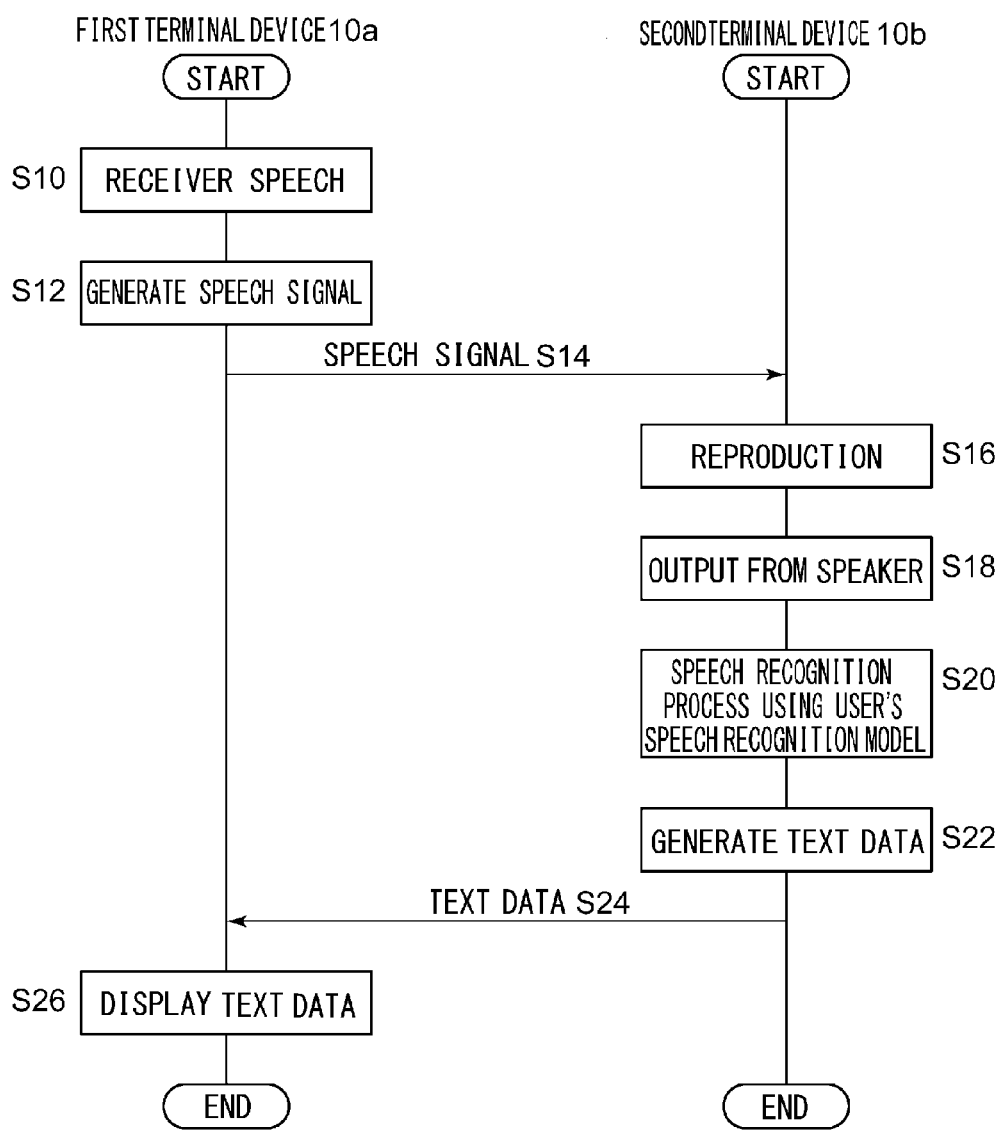
FIG. 4 is a sequence diagram showing steps of communication in the communication system of FIG. 1.

A description will be given of the operation in the communication system 100 with the above configuration. FIG. 4 is a sequence diagram showing steps of communication in the communication system 100. The first terminal device 10a receives a speech (S10) and generates a speech signal (S12). The first terminal device 10a transmits the speech signal (S14). The second terminal device 10b reproduces the speech signal (S16) and outputs the reproduced speech signal from the speaker 34 (S18). The second terminal device 10b executes a speech recognition process according to the user's speech recognition model (S20) and generates text data (S22). The second terminal device 10b transmits the text data (S24). The first terminal device 10a displays the text data (S26).

According to this embodiment, a speech signal is subject to a process based on a speech recognition model of a user using a terminal device so that a received speech signal can be turned into a text, reflecting the speech recognition way by the user. Since the received speech signal is turned into a text, reflecting the speech recognition way by the user, accurate information is conveyed to the transmitter of speech. Since a speech signal is subject to a speech recognition process, using a speech recognition model of the user, pronunciation of a transmitter of speech that is heard wrong can be identified. Further, since a speech signal is subject to a speech recognition process, using a speech recognition model of the user, a speech that is heard wrong by the receiver of speech in a wireless segment can be identified.

Embodiment 2

A description will now be given of Embodiment 2. Like Embodiment 1, Embodiment 2 relates to terminal device adapted to communicate a speech using a PTT service and use a speech recognition model of a receiver of speech to turn the speech signal into a text. The speech recognition model of Embodiment 1 is built upon waveforms of speech signals recognized by the receiver of speech. Meanwhile, the speech recognition model in Embodiment 2 is built upon a speech speed recognizable by the receiver of speech and a sound volume level recognizable by the receiver of speech. The communication system and the terminal device according to Embodiment 2 are similar in type to those shown in FIGS. 1 and 2. A description will now be given of a difference.

In (2) described above, the processing unit 28 receives the speech signal from the reproduction unit 32. Further, the processing unit 28 turns the speech signal into a text by subjecting the speech signal to a speech recognition process. Meanwhile, the speech recognition model of the user using the terminal device 10, i.e., a designated receiver of speech, is configured in the configuration unit 38. For example, at least one of a value of speech speed recognizable by the receiver of speech and a value of a sound volume level recognizable by the receiver of speech is stored in the speech recognition model.

The processing unit 28 calculates the value of speech speed of the speech signal during a predetermined period of time by counting the number of characters in text data. The processing unit 28 determines whether the speed of the speech signal is equal to or smaller than the speech speed recognizable by the receiver of speech by comparing the derived value of speech speed and the value of speech speed stored in the configuration unit 38. If the derived value of speech speed is greater than the value of speech speed recognizable by the receiver of speech, the processing unit 28 masks those of the characters in the text data beyond the speech speed recognizable by the receiver of speech. If the derived value of speech speed is equal to or smaller than the speech speed recognizable by the receiver of speech, the processing unit 28 does not mask the text data.

The processing unit 28 may derive the value of sound volume level of the speech signal during a predetermined period of time. The processing unit 28 determines whether the sound volume level of the speech signal is equal to or greater than the sound volume level recognizable by the receiver of speech by comparing the derived value of sound volume level and the value of sound volume level stored in the configuration unit 38. If the derived value of sound volume level is smaller than the value of sound volume level recognizable by the receiver of speech, the processing unit 28 masks the characters in the text data. If the derived value of sound volume level is equal to or greater than the sound volume level recognizable by the receiver of speech, the processing unit 28 does not mask the text data. Thus, at least one of the sound volume level and speech speed is reflected in the speech recognition process in the processing unit 28. The speech recognition model of the receiver of speech is configured in the configuration unit 38 by using the control interface 24. The content configured is at least one of the value of speech speed recognizable by the receiver of speech and the value of sound volume level recognizable by the receiver of speech.

The transmission unit 40 receives the text data from the processing unit 28. The transmission unit 40 transmits the text data to the terminal device 10 at the transmitting end. As described above, if the derived value of speech speed is greater than the value of speech speed recognizable by the receiver of speech or if the derived value of sound volume level is smaller than the sound volume level recognizable by the receiver of speech, at least some of the characters in the text data are masked. This is equivalent to the transmission unit 40 transmitting a result of determination as to whether the derived value of speech speed is equal to or smaller than the speech speed recognizable by the receiver of speech or transmitting a result of determination as to whether the derived value of sound volume level is equal to or greater than the sound volume level recognizable by the receiver of speech.

Figure 5A:
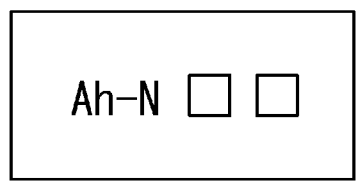
FIGS. 5A-5B show screens displayed in the display unit according to Embodiment 1.
Figure 5B:
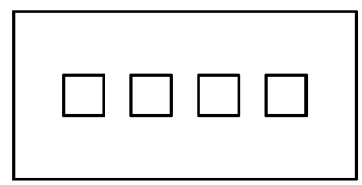

In (3) described above, the reception unit 42 receives the text data from the terminal device 10 at the receiving end and the processing unit 28 displays the text data in the display unit 26. FIGS. 5A-5B show screens displayed in the display unit 26. FIG. 5A shows a case where the value of speech speed of the speech signal reproduced in the terminal device 10 at the receiving end is greater than the value of speech speed recognizable by the receiver of speech. In this case, some of the characters are masked. Meanwhile, FIG. 5B shows a case where the value of sound volume level of the speech signal reproduced in the terminal device 10 at the receiving end is smaller than the value of sound volume level recognizable by the receiver of speech. In this case, all of the characters are masked.

Figure 6:
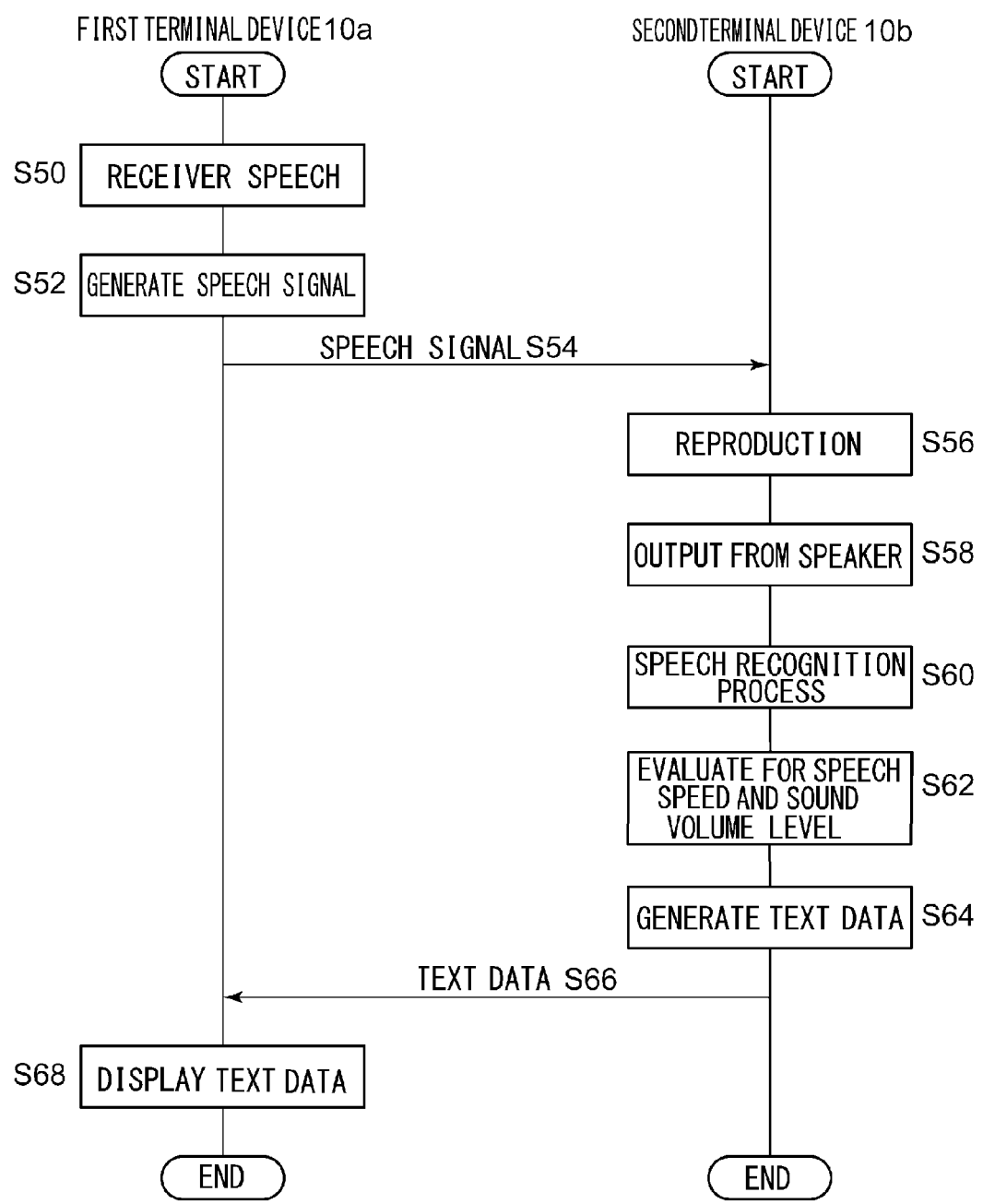
FIG. 6 is a sequence diagram showing steps of communication in the communication system according to Embodiment 2.

A description will be given of the operation in the communication system 100 with the above configuration. FIG. 6 is a sequence diagram showing steps of communication in the communication system 100 according to Embodiment 2. The first terminal device 10*a* receives a speech (S50) and generates a speech signal (S52). The first terminal device 10*a* transmits the speech signal (S54). The second terminal device 10*b* reproduces the speech signal (S56) and outputs the reproduced speech signal from the speaker 34 (S58). The second terminal device 10*b* executes a speech recognition process (S60) and generates text data (S64) by evaluating the speech signal for speech speed and sound volume level (S62) The second terminal device 10*b* transmits the text data (S66). The first terminal device 10*a* displays the text data (S68).

According to this embodiment, the speech signal is subject to determination as to whether the speed of the speech signal is equal to or smaller than the speech speed recognizable by the user. It can therefore be determined whether the speech is difficult to be heard due to the speech speed. Also, the fact that the speech is difficult to be heard due to the speech speed can be reflected in the text. The speech signal is also subject to a determination as to whether the sound volume level of the speech signal is equal to or greater than the sound volume level recognizable by the user. It can therefore be determined whether the speech is difficult to be heard due to the sound volume level. Also, the fact that the speech is difficult to be heard due to the sound volume level can be reflected in the text.

Embodiment 3

A description will now be given of Embodiment 3. Like the foregoing embodiments, Embodiment 3 relates to terminal devices adapted to communicate a speech using a PTT service and use a speech recognition model of a receiver of speech to turn the speech signal into a text. In Embodiment 3, not only the speech signal is turned into a text but also information that gives estimation of a situation of the receiver of speech hearing the speech is communicated to the terminal device at the transmitting end. The communication system according to Embodiment 3 is similar in type to the system shown in FIG. 1. A description will now be given of a difference.

Figure 7:
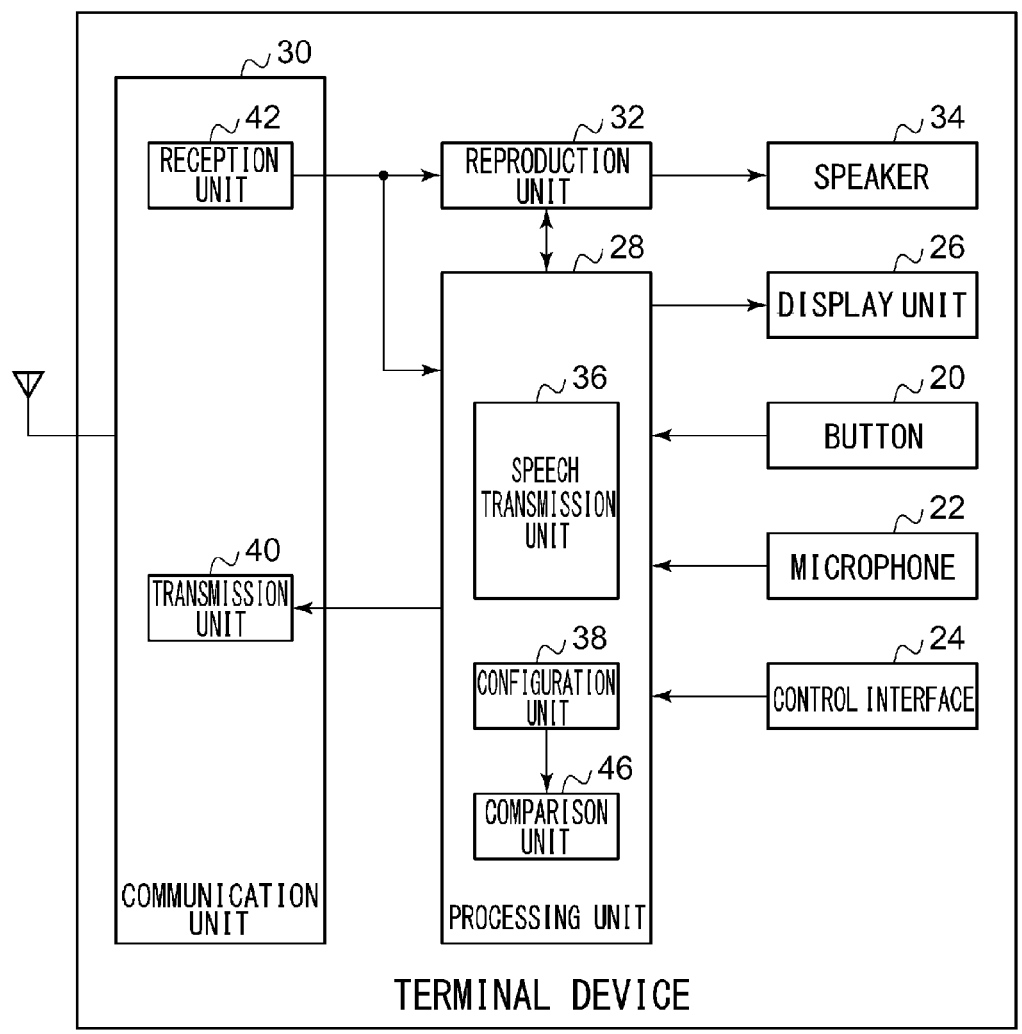
FIG. 7 shows a configuration of the terminal device according to Embodiment 3.

FIG. 7 shows a configuration of the terminal device 10 according to Embodiment 3. In comparison with FIG. 2, the processing unit 28 in the terminal device 10 further includes a comparison unit 46. The processing unit 28 receives the speech signal from the reproduction unit 32. Thus, the processing unit 28 subjects the speech signal to a speech recognition process based on the speech recognition model of the user using the terminal device 10, i.e., performs a speech recognition process that reflects the speech recognition way by the user. As a result, the speech signal is turned into a text (hereinafter, the speech signal turned into a text will be referred to as "first text").

In this process, the processing unit 28 may determine whether an unrecognizable phoneme is found in a speech recognition process. For example, if a correlation value indicating correlation between the waveform of the first phoneme in the input speech signal and the waveform closest to the waveform of the first phoneme is smaller than a predetermined value, the first phoneme is determined as an unrecognizable phoneme. The processing unit 28 masks an unrecognizable phoneme in the first text. Instead of masking the text data, the processing unit 28 may convert relevant characters into predetermined characters or appends a message "there is an unrecognizable phoneme" to the first text.

Meanwhile, the processing unit 28 also stores a speech recognition model not bound to the user of the terminal device 10, i.e., a standard speech recognition model. In a standard speech recognition model, a standard waveform of a speech signal corresponding, for example, to a sound "Ah" is stored. The processing unit 28 also subjects the speech signal to a speech recognition process based on the standard speech recognition model, i.e., without reflecting the speech recognition way by the user. In this case, too, the sound signal is turned into a text (hereinafter, the speech signal turned into a text will be referred to as "second text"). As in the case of the first text, the processing unit 28 may mask unrecognizable phonemes in the second text.

The comparison unit 46 receives the first text and the second text. The comparison unit 46 compares the first text with the second text. It is assumed in this case that the first text and the second text are arranged adjacent to each other. The comparison unit 46 outputs text data in which the first text and the second text are arranged to the transmission unit 40. The transmission unit 40 receives the text data from the processing unit 28. The transmission unit 40 transmits the text data resulting from the comparison to the terminal device 10 at the transmitting end.

Figure 8A:
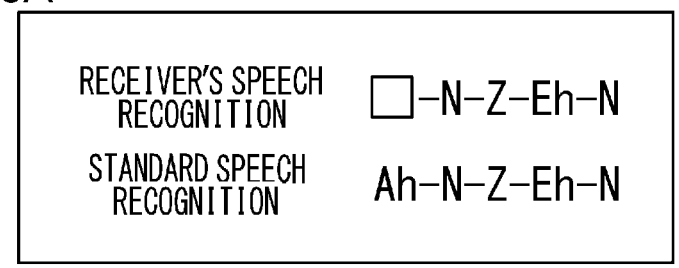
FIGS. 8A-8B show screens displayed in the display unit of FIG. 7.
Figure 8B:
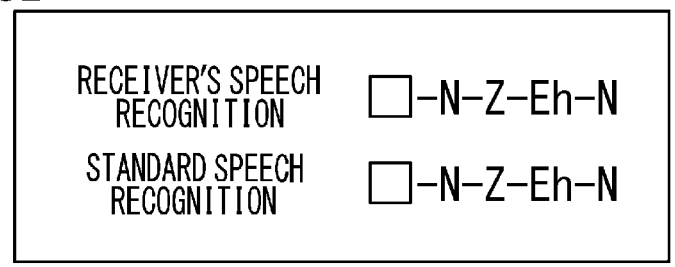

In (3) described above, the reception unit 42 receives the text data from the terminal device 10 at the receiving end and the processing unit 28 displays the text data in the display unit 26. FIGS. 8A-8B show screens displayed in the display unit 26. Toward the top of the screen is shown the first text indicating "receiver's speech recognition," and toward the bottom of the screen is shown the second text indicating "standard speech recognition." FIG. 8A shows a case where the first text includes an unrecognizable phoneme despite the fact that the second text does not include an unrecognizable phoneme. This translates into the fact that the speech signal corresponding to the speech originated by the transmitter of speech is completely recognized in a speech recognition process using the standard speech recognition model, but an unrecognized phoneme is found in the speech recognition process using the speech recognition model of the receiver of speech. In other words, the speech is not recognized due to the way that the receiver of speech hears the speech.

FIG. 8B shows a case where the either of the first text and second text includes an unrecognized phoneme. This translates into the fact that an unrecognized phoneme is found when the speech signal corresponding to the speech originated by the transmitter of speech is subject to a speech recognition process using either the standard speech recognition model or the speech recognition model of the receiver of speech. In this case, it is estimated, for example, that the quality of the wireless segment between the first terminal device 10a and the first base station device 12a or the wireless segment between the second terminal device 10b and the second base station device 12b has become poor.

Figure 9:
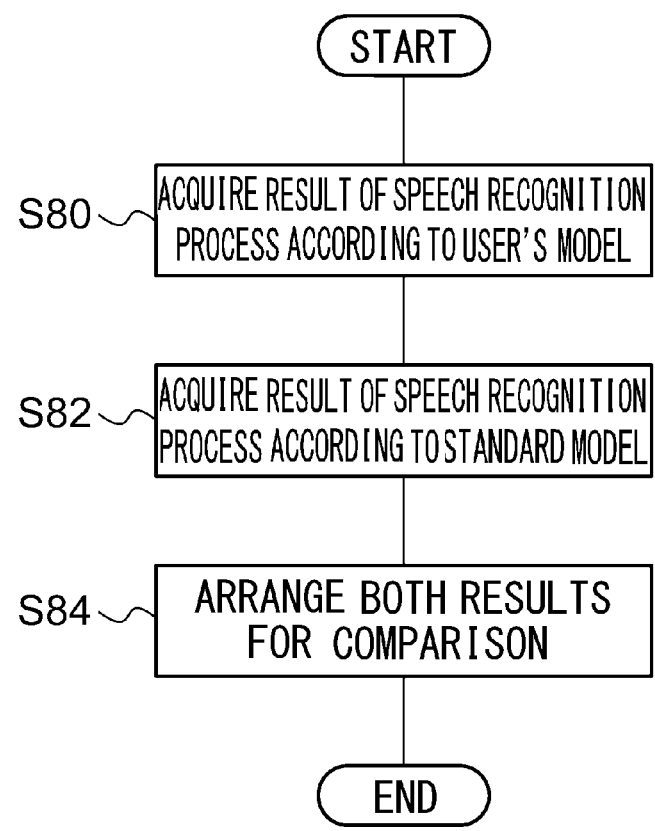
FIG. 9 is a flowchart showing steps of comparison by the comparison unit of FIG. 7.

A description will be given of the operation in the communication system with the above configuration. FIG. 9 is a flowchart showing steps of comparison by the comparison unit 46. The comparison unit 46 acquires a result of the speech recognition process based on the user's speech recognition model (S80). The comparison unit also acquires a result of the speech recognition process based on the standard speech recognition model (S82). The comparison unit 46 arranges the results of speech recognition processes for comparison (S84).

According to this embodiment, the result of the speech recognition process based on the user's speech recognition process is compared with the result of the speech recognition process based on the standard speech recognition model. Accordingly, it is possible to identify at what stage an unrecognizable phoneme occurs. In further accordance with the embodiment, it is possible to know that a particular user cannot hear the speech if an unrecognizable phoneme is found as a result of the speech recognition process based on the user's speech recognition model and if an unrecognizable phoneme is not identified as a result of the speech recognition process based on the standard speech recognition model. If an unrecognizable phoneme is found as a result of the speech recognition process based on the user's speech recognition mode and as a result of the speech recognition process based on the standard speech recognition model, it can be known that an error is caused at the stage of speech origination or communication.

Embodiment 4

A description will now be given of Embodiment 4. Like the foregoing embodiments, Embodiment 4 also relates to terminal device adapted to communicate a speech using a PTT service and turn a received speech signal into a text. In the user terminal device at the receiving end, the user may provide a configuration for on/off of the equalizer, sound volume level output from the speaker, or on/off of speech speed transformation. The speech processed according to the configuration is output from the speaker. The process may cause the speech actually output from the speaker to be different from the content of text data.

In order to address this issue, the terminal device according to this embodiment, and, in particular, the terminal device at the receiving end performs a speech recognition process in accordance with the configuration provided in the terminal device. Consequently, the content of text data generated in the terminal device reflects the process dependent upon the configuration. The communication system and the terminal device according to Embodiment 4 are similar in type to those shown in FIGS. 1 and 2. A description will now be given of a difference.

In (2) described above, various parameters for configuration related to the output of speech are defined in the configuration unit 38 of the terminal device 10. The configuration is a registration of values that should be used to reproduce a speech signal received in the reception unit 42. One of the parameters for configuration defined in the configuration unit 38 is whether to turn the equalizer on or off. An equalizer is a process to change the frequency characteristics of a speech signal. If the equalizer is turned on, a designated frequency band (overtone, harmonics, or noise components) in the speech signal can be enhanced or reduced. Another parameter for configuration defined in the configuration unit 38 is whether to turn speech speed transformation on or off. Speech speed transformation is a process to increase or decrease the speed of reproduced speech. Still another parameter for configuration defined in the configuration unit 38 is adjustment of sound volume level. Sound volume level is a volume of speech output from the speaker 34. These parameters are defined by using the control interface 24. Not all of these parameters need be defined in the configuration unit 38 and the configuration unit 38 may include a definition of at least one of these parameters.

The reproduction unit 32 receives a speech signal from the reception unit 42 and reproduces the speech signal. In this process, the configuration parameters defined in the configuration unit 38 are reflected. If the equalizer is configured to be turned on in the configuration unit 38, the reproduction unit 32 reproduces the speech signal while performing an equalization process. Meanwhile, if the equalizer is configured to be turned off in the configuration unit 38, the reproduction unit 32 reproduces the speech signal without performing an equalization process.

If speech speed transformation is turned on in the configuration unit 38, the reproduction unit 32 reproduces the speech signal while transforming the speech speed. The speech speed is configured to be 2, 3, ½ times the original. Meanwhile, if speech speed transformation is turned off in the configuration unit 38, the reproduction unit 32 reproduces the speech signal without transforming the speech signal. Further, the reproduction unit 32 adjusts the sound volume level in reproducing the speech signal according to the sound volume level configured in the configuration unit 38. Publicly known techniques may be used for equalization process, speech speed transformation, adjustment of sound volume level, and reproduction of a speech signal so that a description thereof is omitted. As described above, not all of these parameters need be defined in the configuration unit 38 and at least one of the parameters need be defined. Therefore, the reproduction unit 32 may use at least one of the parameters. The reproduction unit 32 outputs the reproduced speech signal and to the speaker 34 and the processing unit 28. The speaker 34 converts the electric speech signal into sound and outputs the sound.

The processing unit 28 receives the speech signal from the reproduction unit 32. The processing unit 28 subjects the speech signal to a speech recognition process based on the aforementioned standard speech recognition model. The speech recognition process turns the speech signal into a text. If an unrecognizable phoneme is found in the speech recognition process, the processing unit 28 may identify a reason (hereinafter, referred to as "reason for error"). The processing unit 28 identifies a reason for error by determining whether: (A) any unrecognizable phoneme is found in the speech recognition process; (B) the speech speed of the reproduced speech signal is greater than a threshold value; and (C) the sound volume level of the reproduced speech signal is smaller than a threshold value. The threshold values in (B) and (C) may be different. A description will be of these steps in sequence.

(A) Whether any Unrecognizable Phoneme is Found in the Speech Signal

The processing unit 28 determines whether any unrecognizable phoneme is found in the speech recognition process. For example, if a correlation value indicating correlation between the waveform of the first phoneme in the input speech signal and the waveform closest to the waveform of the first phoneme is smaller than a predetermined value, the first phoneme is determined as an unrecognizable phoneme. The processing unit 28 masks unrecognizable phonemes in the text data. Instead of masking the text data, the processing unit 28 may convert relevant characters into predetermined characters or appends a message "there is an unrecognizable phoneme" to the text data. In essence, the processing unit 28 identifies a reason for error in the speech signal by determining whether an unrecognizable phoneme is found in the speech recognition process performed on the speech signal reproduced in the reproduction unit 32 by reflecting the configuration in the terminal device 10.

(B) Whether the Speech Speed of the Reproduced Speech Signal is Greater than a Threshold Value As in Embodiment 2, the processing unit 28 derives the value of speech speed of the speech signal during a predetermined period of time by counting the number of characters in the text data. The processing unit 28 determines whether the speech speed of the speech signal is greater than a threshold value as stored by comparing the derived value of speech speed and the threshold value. If the value of speech speed is greater than the threshold value, the processing unit 28 masks those characters in the text data beyond the threshold value. The processing unit 28 may further append a message to the text data to indicate that the speech speed is too fast. If the value of speech speed is equal to or smaller than the threshold value, the processing unit 28 does not mask the text data.

(C) Whether the Sound Volume Level of the Reproduced Speech Signal is Smaller than a Threshold Value As in Embodiment 2, the processing unit 28 derives the value of sound volume level of the speech signal during a predetermined period of time. The processing unit 28 determines whether the sound volume level of the speech signal is smaller than a threshold value by comparing the derived value of sound volume level with the threshold value. If the value of sound volume level is smaller than the threshold value, the processing unit 28 masks the characters in the text data. The processing unit 28 may further append a message to the text data to indicate that the sound volume level is too small. If the value of sound volume level is equal to or greater than the threshold value, the processing unit 28 does not mask the text data.

The transmission unit 40 receives the text data from the processing unit 28. The text data may include a reason for error identified in the processing unit 28. The transmission unit 40 transmits the text data to the terminal device 10 at the transmitting end. If a reason for error is included, the presence of an unrecognizable phoneme is indicated by a masked character. The reason for error may indicate that the speech speed is greater than the threshold value or that the sound volume level is smaller than the threshold value. If the processing unit 28 does not perform the process of identifying a reason for error, the text data does not include a reason for error.

In (3) above, the reception unit 42 receives the text data from the terminal device 10 at the receiving end. The reception unit 42 outputs the text data to the processing unit 28. The processing unit 28 receives the text data from the reception unit 42 and displays the text data in the display unit 26. If a reason for error is not included in the text data, the display unit 26 displays the text data as in Embodiment 1. The transmitter of speech sees the text data displayed in the display unit 26 and recognizes how the receiver of speech hears the speech.

Figure 10A:
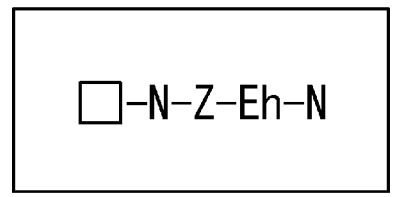
FIGS. 10A-10C show screens displayed in the display unit according to Embodiment 4.
Figure 10B:
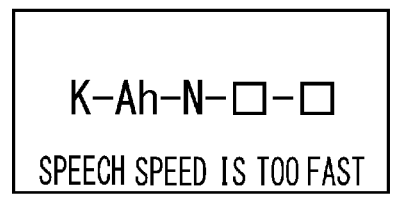
Figure 10C:
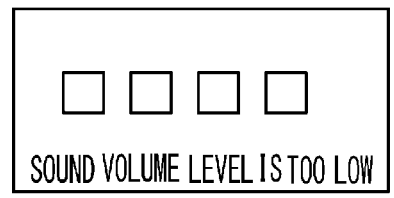

A description will be given below of a case where the text data includes a reason for error. FIGS. 10A-10C show screens displayed in the display unit 26 according to Embodiment 4. FIG. 10A shows a case where the transmitter of speech speaks "Ah-N-Z-Eh-N" but "Ah" is identified as an unrecognizable phoneme. In this case, the receiver of speech may hear the speech as sounding "K-Ah-N-Z-Eh-N."

FIG. 10B shows a case where the value of speech speed is greater than the threshold value. In this case, some of the phonemes are masked and a message is displayed. FIG. 10C shows a case where the value of sound volume level is smaller than the threshold value. In this case, all of the phonemes are masked and a message is displayed.

A description will be given of the operation of the communication system 100 with the above configuration. FIG. 11 is a sequence diagram showing steps of communication in the communication system 100 according to Embodiment 4. The first terminal device 10a receives a speech (S110) and generates a speech signal (S112). The first terminal device 10a transmits the speech signal (S114). The second terminal device 10b reproduces the speech signal (S116) and outputs the reproduced speech signal from the speaker 34 (S118). The second terminal device 10b executes a speech recognition process (S120) and identifies a reason for error (S122). The second terminal device 10b also generates a reason for error (S124). The second terminal device 10b transmits the text data and the reason for error (S126). The first terminal device 10a displays the text data and the reason for error (S128).

Figure 12:
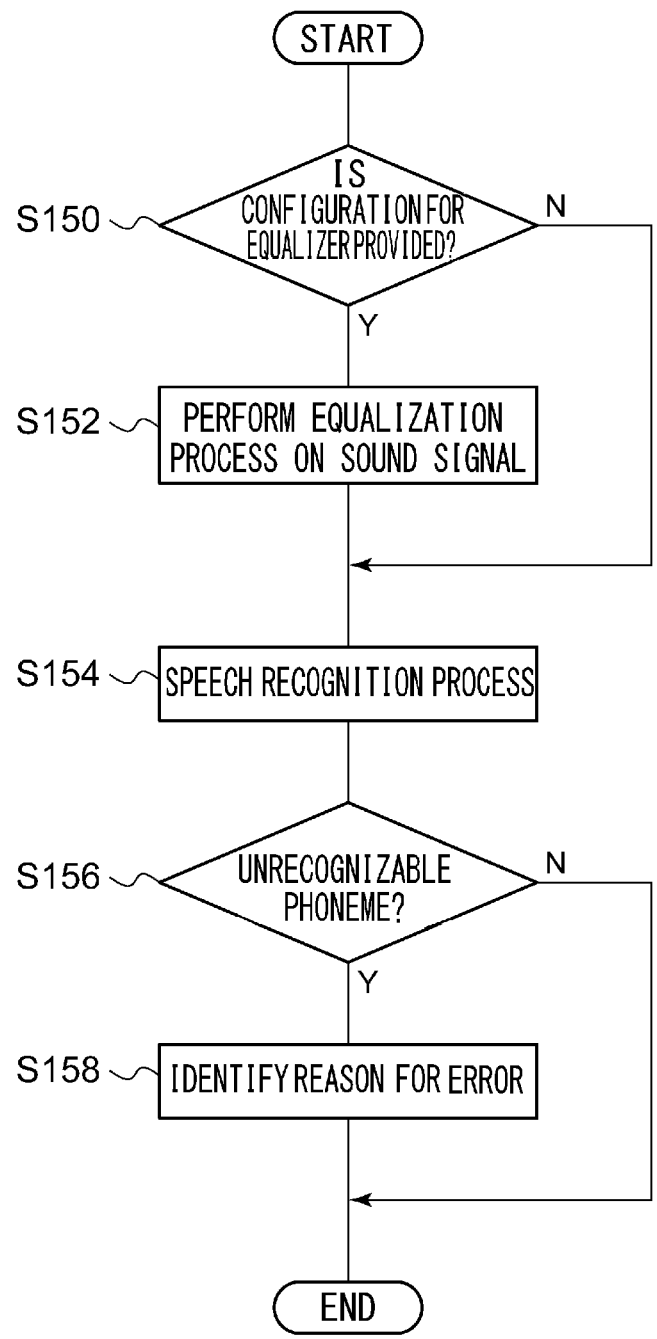
FIG. 12 is a flowchart showing steps for identification in the terminal device according to Embodiment 4.

FIG. 12 is a flowchart showing steps for identification in the terminal device 10 according to Embodiment 4. If a configuration for the equalizer is provided in the configuration unit 38 (Y in S150), the reproduction unit 32 performs an equalization process on the sound signal (S152). If a configuration for the equalizer is not provided in the configuration unit 38 (N in S150), step S152 is skipped. The reproduction unit 32 performs a speech recognition process (S154). If there is an unrecognizable phoneme (Y in S156), the processing unit 28 identifies a reason for error (S158). If there are no unrecognizable phonemes (N in S156), step S158 is skipped.

Figure 13:
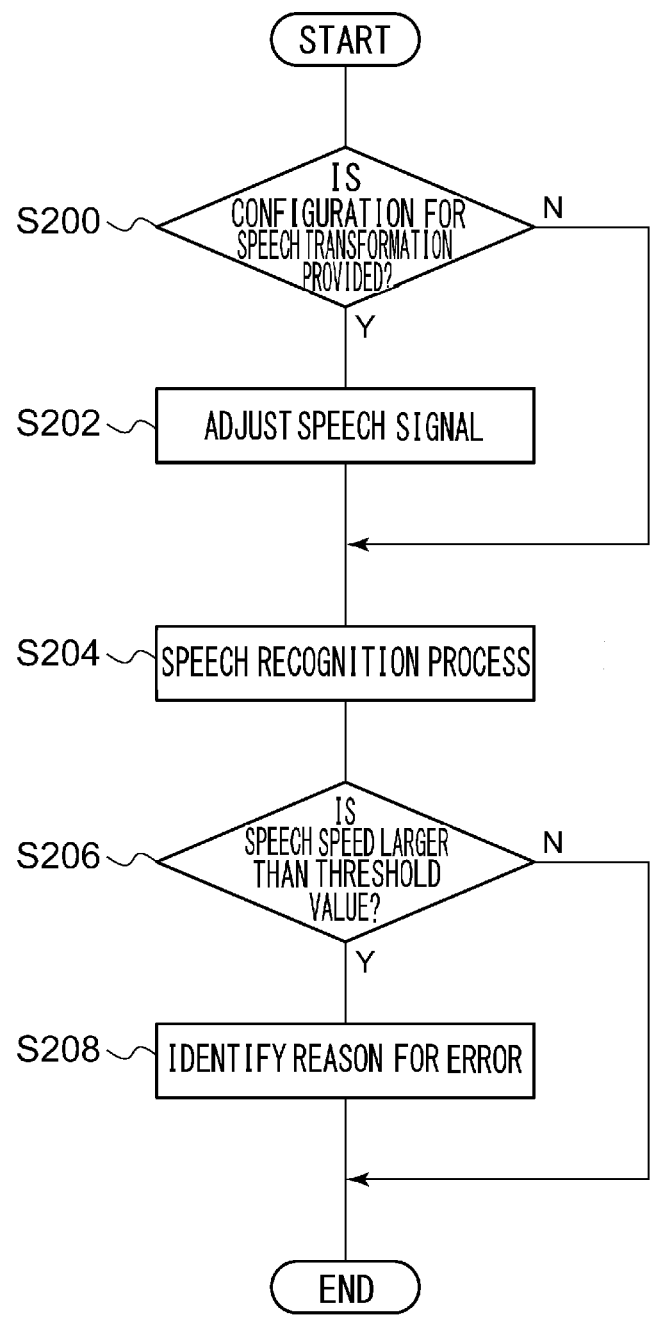
FIG. 13 is a flowchart showing another set of steps for identification in the terminal device according to Embodiment 4.

FIG. 13 is a flowchart showing another set of steps for identification in the terminal device 10 according to Embodiment 4. If a configuration for speech speed transformation is provided in the configuration unit 38 (Y in S200), the reproduction unit 32 adjusts the speech signal (S202). If a configuration for speech speed transformation is not provided in the configuration unit 38 (N in S200), step S202 is skipped. The reproduction unit 32 performs a speech recognition process (S204). If the speech speed is larger than the threshold value (Y in S206), the processing unit 28 identifies a reason for error (S208). If the speech speed is not greater than the threshold value (N in S206), step S208 is skipped.

Figure 14:
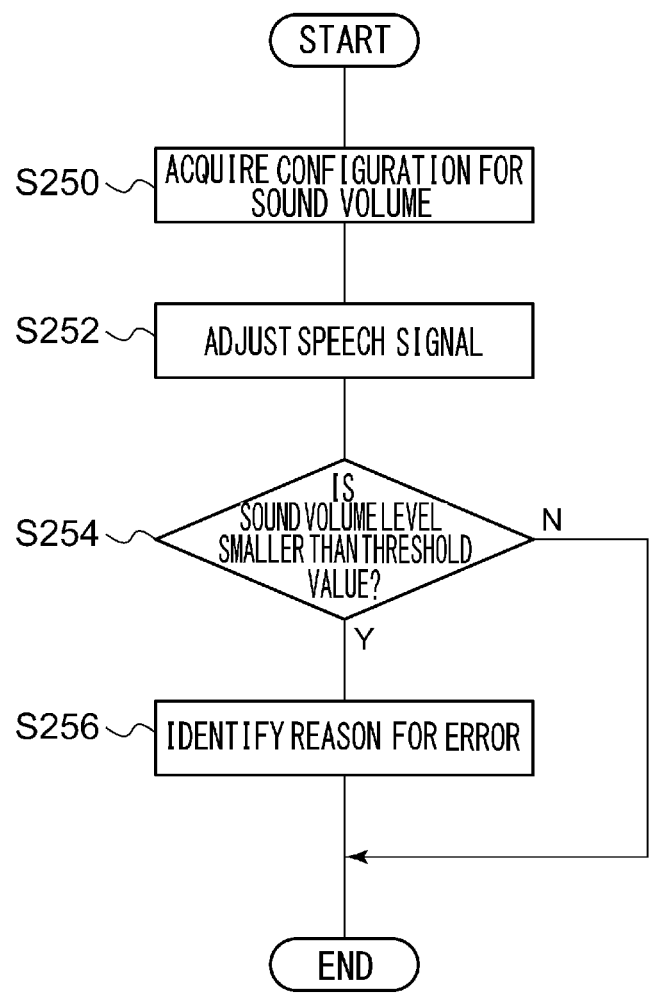
FIG. 14 is a flowchart showing still another set of steps for identification in the terminal device according to Embodiment 4.

FIG. 14 is a flowchart showing still another set of steps for identification in the terminal device 10 according to Embodiment 4. The reproduction unit 32 acquires a configuration for sound volume in the configuration unit 38 (S250). The reproduction unit 32 adjusts the speech signal (S252). If the sound volume level is smaller than the threshold value (Y in S254), the processing unit 28 identifies a reason for error (S256). If the sound volume level is not smaller than the threshold value (N in S254), step S256 is skipped.

According to this embodiment, the speech signal is subject to a speech recognition process, reflecting the configuration in the terminal device. Therefore, the received speech signal can be turned into a text in such a manner that the configuration in the terminal device is reflected. The reason for error in the reproduced speech signal is identified and communicated in such a manner that the configuration in the configuration unit is reflected. Thus, where parameters related to the output of speech signal are configured in the terminal device, the reason that the speech is difficult to be heard can be made known. Since the reason that the speech is difficult to be heard is made known, the speech signal can be transmitted while at the same time overcoming the reason. Since the configuration in the terminal device is reflected, the speech recognition process can be performed such that the way that the speech is actually heard the way is approximated.

Since a determination is made as to whether any unrecognizable phoneme is found in the speech recognition process and a message is provided accordingly, it can be made known that the manner of speaking of the transmitter of speech or communication environment is the cause. Further, since a determination is made as to whether the speech speed of the speech signal is larger than the threshold value is made and a message is provided accordingly, it can be made known that the manner of speaking of the transmitter of speech is the cause. Since a determination is made as to whether the sound volume level of the speech signal is smaller than the threshold value, it can be made known that the manner of speaking of the transmitter of speech is the cause.

Embodiment 5

A description will be given of Embodiment 5. Embodiment 5 corresponds to a combination of Embodiment 4 and Embodiment 3. The communication system and the terminal device according to Embodiment 5 are similar in type to those shown in FIGS. 1 and 7. A description will now be given of a difference.

In (2) above, the reproduction unit 32 receives a speech signal from the reception unit 42 and reproduces the speech signal. In this process, the configuration parameters provided in the configuration unit 38 are reflected as in Embodiment 4. The processing unit 28 receives the speech signal from the reproduction unit 32. The processing unit 28 subjects the speech signal to a speech recognition process based on the standard speech recognition model. In this case, too, the sound signal is turned into a text (hereinafter, the speech signal turned into a text will be referred to as "first text").

Meanwhile, the reproduction unit 32 receives the speech signal from the reception unit 42 and reproduces the speech signal, without using the configuration parameters defined in the configuration unit 38. The processing unit 28 receives the speech signal from the reproduction unit 32. The processing unit 28 subjects the speech signal to a speech recognition process based on the standard speech recognition model. As a result, the speech signal is turned into a text (hereinafter, the speech signal turned into a text will be referred to as "second text").

The comparison unit 46 receives the first text and the second text. The comparison unit 46 compares the first text with the second text. It is assumed in this case that the first text and the second text are arranged adjacent to each other. The comparison unit 46 outputs text data in which the first text and the second text are arranged to the transmission unit 40. The transmission unit 40 receives the text data from the processing unit 28. The transmission unit 40 transmits the text data resulting from the comparison to the terminal device 10 at the transmitting end. The subsequent steps are similar to those described already so that a description thereof is omitted.

According to this embodiment, the result of the speech recognition process using the configuration parameters in the terminal device is compared with the result of the speech recognition process not using the configuration parameters in the terminal device. Accordingly, it is possible to identify at what stage an unrecognizable phoneme occurs. In further accordance with the embodiment, it is possible to know that the speech cannot be heard due to the configuration in the terminal device if an unrecognizable phoneme is found as a result of the speech recognition process using the configuration parameters in the terminal device and if an unrecognizable phoneme is not identified as a result of the speech recognition process not using the configuration parameters in the terminal device. If an unrecognizable phoneme is found as a result of the speech recognition process using the configuration parameters in the terminal device and as a result of the speech recognition process not using the configuration parameters in the terminal device, it can be known that an error is caused at the stage of speech origination or communication.

Embodiment 6

A description will be given of Embodiment 6. Embodiment 6 relates to using information on sound picked up by a microphone in executing the speech recognition process according to Embodiment 4. The communication system and the terminal device according to Embodiment 6 are similar in type to those shown in FIGS. 1 and 7. A description will now be given of a difference.

The microphone 22 picks up sound (e.g., noise) around the terminal device 10. The microphone 22 converts the noise picked up into an electric signal (hereinafter, referred to as "noise signal") and outputs the noise signal to the processing unit 28. The processing unit 28 subjects the speech signal to a speech recognition process, as in Embodiment 4. In executing the process of (A) above to identify a reason for error, the processing unit 28 reflects the information picked up by the microphone 22 in the speech recognition process. For example, the processing unit 28 adjusts the value that should be compared with the correlation value depending on the magnitude of the noise signal. To describe it more specifically, the larger the noise signal, the smaller that the value can be that should be compared with the correlation value. As in the foregoing embodiments, the processing unit 28 determines an unrecognizable phoneme. The subsequent steps are similar to those described already so that a description thereof is omitted.

According to this embodiment, the information on sound around the terminal device picked up by the microphone is reflected so that the speech recognition process can be executed such that the way that the speech is actually heard the way is approximated. Since the speech recognition process is executed such that the way that the speech is actually heard is approximated, the precision of the text is improved.

Embodiment 7

A description will be given of Embodiment 7. Embodiment 7 corresponds to a combination of Embodiment 6 and Embodiment 5. The communication system and the terminal device according to Embodiment 7 are similar in type to those shown in FIGS. 1 and 7. A description will now be given of a difference.

The reproduction unit 32 receives a speech signal from the reception unit 42 and reproduces the speech signal. In this process, the configuration parameters provided in the configuration unit 38 are reflected. The processing unit 28 receives the speech signal from the reproduction unit 32. The processing unit 28 subjects the speech signal to a speech recognition process based on the standard speech recognition model. In executing the process of (A) above to identify a reason for error, the processing unit 28 reflects the information on sound picked up by the microphone 22 in the speech recognition process, as in Embodiment 6. As a result, the speech signal is turned into a text (hereinafter, the speech signal turned into a text will be referred to as "first text").

Meanwhile, the reproduction unit 32 receives the speech signal from the reception unit 42 and reproduces the speech signal, without using the configuration parameters provided in the configuration unit 38. The processing unit 28 receives the speech signal from the reproduction unit 32. The processing unit 28 subjects the speech signal to a speech recognition process based on the standard speech recognition model. However, the processing unit 28 does not reflect the information on sound picked up by the microphone 22 in the speech recognition process. In other words, the speech recognition process is performed without using the sound information. As a result, the speech signal is turned into a text (hereinafter, the speech signal turned into a text will be referred to as "second text").

The comparison unit 46 receives the first text and the second text. The comparison unit 46 compares the first text with the second text. It is assumed in this case that the first text and the second text are arranged adjacent to each other. The comparison unit 46 outputs text data in which the first text and the second text are arranged to the transmission unit 40. The transmission unit 40 receives the text data from the processing unit 28. The transmission unit 40 transmits the text data resulting from the comparison to the terminal device 10 at the transmitting end. The subsequent steps are similar to those described already so that a description thereof is omitted.

According to this embodiment, the result of the speech recognition process using the configuration parameters in the terminal device and also using the information on sound picked up is compared with the result of the speech recognition process not using the configuration parameters in the terminal device and not using the information on sound picked up. Accordingly, it is possible to identify at what stage an unrecognizable phoneme occurs. If an unrecognizable phoneme is found as a result of the speech recognition process using the configuration parameters in the terminal device and using the information on sound picked up, and if an unrecognizable phoneme is not found as a result of the speech recognition process not using the configuration parameters in the terminal device and not using the information on sound picked up, it can be known that the speech cannot be heard due to the configuration in the terminal device or ambient noise. If an unrecognizable phoneme is found as a result of the speech recognition process using the configuration parameters in the terminal device and using the information on sound picked up and as a result of the speech recognition process not using the configuration parameters in the terminal device and not using the information on sound picked up, it can be known that an error is caused at the stage of speech origination or communication.

Embodiment 8

A description will be given of Embodiment 8. Embodiment 8 corresponds to a case of Embodiment 6 where the configuration provided in the terminal device at the receiving end is not reflected in executing a speech recognition process. The configuration provided in the terminal device at the receiving end includes on/off of the equalizer, sound volume level output from the speaker, and on/off of speech speed transformation. In Embodiment 8, as in Embodiment 6, the information on sound picked up by the microphone is used in executing the speech recognition process. The communication system and the terminal device according to Embodiment 8 are similar in type to those shown in FIGS. 1 and 7. A description will now be given of a difference.

In (2) described above, the reproduction unit 32 receives the speech signal from the reception unit 42 and reproduces the speech signal. In this process, the configuration parameters provided in the configuration unit 38 are not reflected, unlike the case of Embodiment 6. The microphone 22 picks up sound (e.g., noise) around the terminal device 10, converts the noise picked up into an electric signal (hereinafter, referred to as "noise signal"), and outputs the noise signal to the processing unit 28. The processing unit 28 subjects the speech signal to a speech recognition process, as in Embodiment 6. In executing the process of (A) above to identify a reason for error, the processing unit 28 reflects the information on sound picked up by the microphone 22 in the speech recognition process. The subsequent steps are similar to those described already so that a description thereof is omitted.

According to this embodiment, information on sound around the terminal device picked up by the microphone is reflected so that the speech recognition process can be executed such that the way that the speech is actually heard is approximated. Since the speech recognition process is executed such that the way that the speech is actually heard is approximated, the precision of the text is improved.

Embodiment 9

A description will be given of Embodiment 9. Embodiment 9 corresponds to a combination of Embodiment 8 and Embodiment 7. The communication system and the terminal device according to Embodiment 9 are similar in type to those shown in FIGS. 1 and 7. A description will now be given of a difference.

In (2) described above, the processing unit 28 receives the speech signal from the reproduction unit 32. The processing unit 28 subjects the speech signal to a speech recognition process based on the standard speech recognition model. In executing the process of (A) above to identify a reason for error, the processing unit 28 reflects the information on sound picked up by the microphone 22 in the speech recognition process, as in Embodiment 8. As a result, the speech signal is turned into a text (hereinafter, the speech signal turned into a text will be referred to as "first text").

Meanwhile, the processing unit 28 subjects the speech signal to a speech recognition process based on the standard speech recognition model. However, the processing unit 28 does not reflect the information on sound picked up by the microphone 22 in the speech recognition process. In other words, the speech signal is subject to the speech recognition process without using the sound information. As a result, the speech signal is turned into a text (hereinafter, the speech signal turned into a text will be referred to as "second text").

The comparison unit 46 receives the first text and the second text. The comparison unit 46 compares the first text with the second text. It is assumed in this case that the first text and the second text are arranged adjacent to each other. The comparison unit 46 outputs text data in which the first text and the second text are arranged to the transmission unit 40. The transmission unit 40 receives the text data from the processing unit 28. The transmission unit 40 transmits the text data resulting from the comparison to the terminal device 10 at the transmitting end. The subsequent steps are similar to those described already so that a description thereof is omitted.

According to this embodiment, the result of the speech recognition process using the information on sound picked up is compared with the result of the speech recognition process not using the information on sound picked up. Accordingly, it is possible to identify at what stage an unrecognizable phoneme occurs. If an unrecognizable phoneme is found as a result of the speech recognition process using the information on sound picked up, and if an unrecognizable phoneme is not found as a result of the speech recognition process not using the information on sound picked up, it is known that the speech cannot be heard due to ambient noise. If an unrecognizable phoneme is found as a result of the speech recognition process using the information on sound picked up and as a result of the speech recognition process not using the information on sound picked up, it can be known that an error is caused at the stage of speech origination or communication.

Described above is an explanation based on an exemplary embodiment. The embodiment is intended to be illustrative only and it will be obvious to those skilled in the art that various modifications to constituting elements and processes could be developed and that such modifications are also within the scope of the present invention.

According to Embodiments 1 through 9, the communication system 100 uses a business wireless system. Alternatively, a wireless communication system other than a business wireless system may be used. According to this variation, the flexibility of configuration is improved.

What is claimed is:

1. A terminal device comprising:
a processor comprises:
a reception unit that receives a speech signal from another terminal device;
a configuration unit that defines:
a configuration parameter used to in processing the speech signal received in the reception unit, and
a speech recognition model mapping a phoneme to a standard waveform;
a reproduction unit that reproduces the speech signal received in the reception unit in accordance with the configuration parameter defined in the configuration unit, wherein the configuration parameter comprises at least one of:
turning an equalizer on, wherein the equalizer processes change frequency characteristics of the speech signal, turning a speech speed transformation on, wherein the speech speed transformation increases or decreases the speed of the speech signal, or adjusting a sound level of the speech signal;
a processing unit that:
selects a waveform close to the speech signal reproduced in the reproduction unit from the speech recognition model defined in the configuration unit, and
performs a speech recognition process using the configuration parameter to identify a phoneme corresponding to the selected waveform; and
a transmission unit that transmits a result of the speech recognition process in the processing unit to the another terminal device,
wherein the reproduction unit reproduces the speech signal received in the reception unit without using the configuration parameter defined in the configuration unit, and wherein the processing unit:
further performs the speech recognition process on the speech signal reproduced without using the configuration parameter,
compares a first result of the speech recognition process on the speech signal reproduced without using the configuration parameter with a second result of the speech recognition process on the speech signal reproduced based on the configuration parameter, and
outputs a result of the comparison of the first result and the second result, wherein the result of the comparison of the first result and the second result describes a reason for error of the speech recognition process using and without using the configuration parameter; and
a transmission unit that transmits, as the result of the second speech recognition process, the result of the comparison of the first result and the second result in the processing unit to the another terminal device.

2. The terminal device according to claim 1,
wherein the first speech recognition model mapping a phoneme is recognized by the user when the user using the terminal device hears the speech signal and a waveform;
wherein the processing unit selects the waveform close to the speech signal received in the reception unit from the first speech recognition model defined in the configuration unit; and
wherein the speech recognition process identifies the phoneme corresponding to the selected waveform.

* * * * *